3,375,888
LOST CIRCULATION MATERIAL
James L. Lummus and Billy V. Randall, Tulsa, Okla., assignors to Pan American Petroleum Corporation, Tulsa, Okla., a corporation of Delaware
No Drawing. Filed June 7, 1965, Ser. No. 462,111
10 Claims. (Cl. 175—72)

ABSTRACT OF THE DISCLOSURE

Loss of well drilling fluids to both high granular permeability and to fractures, crevices and the like, is stopped by a combination of flexible flakes, flexible fibers and strong rigid flakes or granules. The volume of fibers must be from about one-third to about three times the volume of flexible flakes and the volume of granules or rigid flakes must be from about one-tenth to about two-thirds the sum of volumes of flexible flakes and fibers.

---

When drilling fluids are lost to drilled formations, such loss is usually called lost circulation. Materials added to drilling fluids to prevent or decrease such loss are called lost circulation recovery materials, sealing materials or sometimes simply lost circulation materials or additives. Many lost circulation materials have been proposed in the past. These are ordinarily either granules, flakes or fibers.

Recent studies have shown that a lost circulation material which is best for one area is not necessarily best for another. Several tests have been devised to aid in predicting performance of lost circulation materials in these various areas. Two tests seem to be most widely used. In one of these a plate with a slot is placed in the bottom of a filtrate-rate tester. Mud containing the lost circulation additive is then poured into the tester and pressure is applied to see if the composition will seal the slot. Several plates with slots of various widths are normally used in separate tests to determine the largest slot which can be sealed.

In the second test a perforated plate is placed in the bottom of a filtrate-rate tester and a thick layer of marbles is placed on the plate. The composition to be tested is poured in and pressure is applied to determine if the marble bed can be sealed. Sometimes gravel is substituted for the marbles. The marbles or gravel may vary in size from as small as about ⅛-inch in diameter to as much as about 1-inch in diameter. The average is about a ½-inch marble.

For areas where loss is to fractures and cracks, the slot test seems best. For areas where loss is to loosely consolidated conglomerates, gravel beds or the like, the marble test seems best. In general, an additive which is best in one test is not best in the other test. Mixtures of different types of additives have been used in an effort to obtain a material which is effective in all areas. An example is U.S. Patent 2,799,647 Borcherd, which teaches the use of ground almond shells containing granules, flakes and fibers. While such mixtures have some advantages, the mixtures presently available leave much to be desired.

Still another problem has arisen due to the preferred way of using lost circulation additives. At one time a widely used practice was to introduce a low concentration of additive into the entire mud system. The present tendency seems to be to make up a batch or "pill" of mud containing a very high concentration of additive and circulate this pill to the loss zone in the well. Some of the additives which give poor results at low concentrations, give good results at high concentrations and vice versa.

Frequently, when lost circulation occurs, it is not known whether the loss is to a fracture or to a gravel bed. Therefore, an additive which is highly effective for sealing both is desired.

With these problems in mind, an object of this invention is to provide a composition which is effective for sealing both fractures and gravel beds. A more specific object is to provide a drilling fluid additive which can be used in high concentrations in a small batch of drilling fluid to stop lost circulation to either fractures, gravel beds, or both. Still another object is to provide a method for stopping loss of drilling fluids to both crevices and gravel beds.

In general, we accomplish the objects of our invention by using a specific type of flakes mixed in a definite ratio with fibers in a drilling fluid in which strong, preferably granular, materials are present in a certain concentration range. If all the limitations are observed, a composition is provided which has superior sealing qualities for both fractures and gravel beds.

The invention, and particularly the limitations, will be better understood from consideration of the data in the table. This table reports the results of slot tests and marbles tests. In the slot tests the slot width stated in the table is the widest which could be sealed with the composition tested. The seal pressure is the lowest pressure which caused a seal to form. In this test after the drilling fluid was poured into the tester, either an immediate seal formed and no liquids ran out, or some volume ran out, under the hydrostatic head of the liquid, until a seal did form. The top was then placed on the container and pressure was applied to the drilling fluid. The pressure was increased at a rate of 10 pounds per square inch about every 4 or 5 seconds. As soon as pressure was applied, flow of liquid from the test cell began and continued until some minimum pressure was reached where a seal occurred and flow of liquid stopped or decreased to a drip. The pressure was then raised to 100 pounds to be sure the seal would hold this differential pressure. The seal pressure was recorded together with the volume through at atmospheric pressure, at the time the seal occurred, and at the time the pressure reached 100 pounds per square inch. The largest slot tested was a 0.20-inch slot.

In the marbles test, the procedure was the same except that the entire 100 pounds per square inch pressure was applied at once rather than slowly. This has been found to provide more reproducible results. Marbles about ⅝-inch in diameter were used. The marbles bed was about 2¼ inches deep. In this test a rapid flow of liquid occurred upon application of pressure until a seal formed. Sometimes the seal was perfect so flow of liquid stopped completely. Sometimes the seal was only partial, a small stream of liquid continuing to flow until all the liquid was drained from the cell. A complete seal is preferred of course. Some of the partial seals were so nearly perfect, however, that it was obvious the compositions tested would provide a very great reduction in loss of drilling fluids to gravel beds and the like. In these cases the table indicates that a seal did form but shows by the term "all" in the total volume column that some leakage continued until all the liquid was gone. In all cases about 1,000 milliliters of drilling fluid was used. If the table reports no seal formed, then there was only a small decrease in flow rate of the liquid before the entire volume was exhausted.

| Test No. | Additives | | | | | | Slot Test | | | | | Marbles Test | | |
|---|---|---|---|---|---|---|---|---|---|---|---|---|---|---|
| | Flakes | | Fibers | | Granules | | Slot Width, Inches | Seal Press., P.s.i.g. | Volumes | | | Seal | Volumes | |
| | Lb./bbl. | Material | Lb./bbl. | Material | Lb./bbl. | Material | | | Atmos. | Seal | Total | | Atmos. | Seal |
| 1 | 30 | Flake 1 | | | | | .16 | 20 | 0 | 10 | 25 | Yes | 0 | 465 |
| 2 | | | 30 | Fiber 1 | | | .20 | 30 | 0 | 25 | 25 | No | 0 | All |
| 3 | | | | | 30 | Walnut (m) | .06 | (¹) | | | | | | |
| 4 | 15 | Flake 1 | 15 | Fiber 1 | | | .16 | 35 | 0 | 10 | 10 | Yes | 0 | 200 |
| 5 | 15 | ...do... | | | 15 | Walnut (m) | .20 | 50 | 10 | 300 | 300 | No | 112 | All |
| 6 | | | 15 | Fiber 1 | 15 | ...do... | .20 | 35 | 225 | 300 | 350 | | | |
| 7 | 20 | Flake 1 | | | 10 | ...do... | | | | | | Yes | 50 | All |
| 8 | | | 20 | Fiber 1 | 10 | ...do... | | | | | | No | 0 | All |
| 9 | 10 | Flake 1 | 10 | ...do... | 10 | ...do... | .20 | 35 | 10 | 75 | 100 | Yes | 0 | 450 |
| 10 | 30 | Coarse Almond Shells.² | | | | | | | | | | No | 140 | All |
| 11 | 30 | Medium Almond Shells. | | | | | | | | | | No | All | All |
| 12 | 30 | Fine Almond Shells. | | | | | | | | | | No | All | All |
| 13 | 10 | Mica | 10 | Fiber 1 | 10 | Walnut (m) | .16 | 80 | 600 | 800 | 850 | No | 350 | All |
| 14 | 10 | Flake 2 | 10 | ...do... | 10 | ...do... | .20 | 75 | 100 | 250 | 260 | No | 175 | All |
| 15 | 10 | Polyethylene film | 10 | ...do... | 10 | ...do... | .20 | 30 | 0 | 50 | 50 | Yes | 50 | 500 |
| 16 | 5 | Flake 1 | 15 | ...do... | 10 | ...do... | | | | | | Yes | 30 | All |
| 17 | 7 | ...do... | 13 | ...do... | 10 | ...do... | .20 | 30 | 0 | 25 | 50 | Yes | 0 | All |
| 18 | 13 | ...do... | 7 | ...do... | 10 | ...do... | .20 | 30 | 10 | 50 | 100 | Yes | 0 | 800 |
| 19 | 15 | ...do... | 5 | ...do... | 10 | ...do... | | | | | | Yes | 30 | 685 |
| 20 | 10 | ...do... | 10 | Fiber 2 | 10 | ...do... | | | | | | Yes | 10 | 575 |
| 21 | 10 | ...do... | 5 / 5 | Fiber 1 / Fiber 2 | 5 / 5 | Walnut (m) / Walnut (c) | | | | | | Yes | 0 | 550 |
| 22 | 10 | ...do... | 10 | Fiber 1 | 5 / 5 | Walnut (m) / Walnut (f) | .20 | 35 | 0 | 10 | 25 | Yes | 0 | 850 |
| 23 | 10 | ...do... | 10 | ...do... | 10 | Granular Plastic | .20 | 35 | 0 | 25 | 50 | Yes | 0 | 800 |
| 24 | 10 | ...do... | 10 | ...do... | 10 | Flake 2 | .20 | 25 | 0 | 275 | 325 | Yes | 0 | 500 |
| 25 | 10 | ...do... | 10 | ...do... | 10 | Walnut (c) | | | | | | No | 10 | All |
| 26 | 7.5 | ...do... | 7.5 | ...do... | 15 | Walnut (m) | | | | | | No | 100 | All |
| 27 | 9 | ...do... | 9 | ...do... | 12 | ...do... | .20 | 30 | 10 | 50 | 100 | Yes | 0 | All |
| 28 | 12 | ...do... | 12 | ...do... | 6 | ...do... | .20 | 30 | 0 | 25 | 25 | Yes | 0 | 350 |
| 29 | 5 | ...do... | 5 | ...do... | 5 | ...do... | .20 | 30 | 50 | 150 | 175 | Yes | 135 | All |
| 30 | 15 | ...do... | 15 | ...do... | 15 | ...do... | | | | | | Yes | 0 | 5.5 |

¹ Did not completely seal.
² Flakes, fibers and granules.

Flake 1 is chopped film of regenerated cellulose, mostly lacquered regenerated cellulose. Fiber 1 is shredded carpets; a form of fibers probably mostly wool and polyamide polymers. Fiber 2 is cane fibers. Flake 2 is flakes of thermoset polymer. The ground walnut shells were usually a medium grind (m), passing a number 12 U.S. Standard sieve and retained on a number 60 sieve. The coarse grind (c) included some particles in the range passing a number 4 and retained on a number 10 sieve as well as smaller particles. Only 14 percent passed a number 16 sieve. The fine grind (f) contained only particles passing a number 20 sieve. The granular plastic in Test 23 had about the same particle size distribution as the medium-grind walnut shells except for a little wider range of particle size. Some of the plastic platelets in Flake 2 were as large as ¼-inch across or even a little larger and were between about ¹⁄₆₄ and ¹⁄₃₂-inch thick.

With regard to the slot tests the most surprising result is the poor performance of the high concentration of walnut shells in Test 3. The lower concentrations of walnut shells are known to do a good job of sealing slots. The explanation of the poor results may lie partly in the high concentration which was used, but is probably due more to the fact that only about 32 percent of the particular grind used was retained on a number 16 U.S. Standard sieve. In addition, there were very few particles passing a number 60 sieve. Thus, there was neither enough coarse nor fine particles to do a really good job when this particular medium nutshell grind was used alone. The remaining slot tests simply show that all the three-way mixes tested sealed a 0.20-inch slot as long as the flakes were flexible. In Test 13 the weak and brittle mica caused failure to seal a 0.20-inch slot. Note also that in Test 4 in the absence of hard granules the flakes and fibers alone would not seal a large slot. It was somewhat surprising to find in Test 24 that the hard, strong flakes of thermoset plastic could be substituted for the granules. It will be noted, however, that the amount of liquid lost before a seal formed was quite high. It is also known that the thin flakes have a tendency to break under higher differential pressure. Therefore, the granules with minimum dimensions at least half the maximum dimensions are preferred for the hard, strong ingredient of the competition.

The table shows that it is much more difficult to meet the requirements of the marbles test. Test 1 shows that flexible flakes alone are effective in sealing the marbles and high concentrations such as 30 pounds per barrel will even seal fairly large slots. Test 2 indicates that fibers will not seal marbles. Tests throughout the table show the bad effects of granules in these tests. Test 5, for example, shows that substitution of granules for some of the flexible flakes in Test 1 causes failure to form a seal. Test 7 shows that a partial seal can be formed by decreasing the granule concentration to 10 pounds per barrel and increasing the flexible flakes concentration to 20 pounds per barrel. In order to get a good seal, however, a three-way mix of flexible flakes, fibers and granules, as shown in Test 9, was necessary. That a mixture of flexible flakes and fibers is more effective than flexible flakes alone in the marbles test is shown by comparing Tests 1 and 4 as well as by comparing Tests 7 and 9. The slot test in Test 4 shows the need for the granules used in Test 9.

Tests 10 to 14 all included flakes, fibers and granules. None of these formed a seal in the marbles test. The mix used in Test 13 did not even do a very good job in the slot test. It will be obvious, then, that providing a universally effective lost circulation additive is not as simple as mixing flakes, fibers and granules. All the flakes in Tests 10 to 14 are rigid and rather brittle. The flakes which formed operative mixes, as in Tests 9 and 15, for example, were flexible. Some of the flexible flakes were also very large, many of them measuring more than an inch across. The more rigid flakes, on the other hand, were quite small, few of them being as large as ¼-inch in diameter. Of course, the rigid flakes should not be much larger than ¼ inch to avoid bridging the bit ports and the like. Preferably the rigid flakes should pass a number 4 sieve. The flexible flakes, on the other hand, deform easily to pass through large bit ports. Upon reaching a gravel bed, for example, they conform to the surface of the gravel particles, sealing off the small holes between the particles. The fibers seem to reinforce the flakes, either by penetrating the holes and thus providing at least a partial support for the flakes or by depositing between two adjacent flakes or sheets to provide additional strength. Probably both functions occur.

At least some of the flexible flakes, for example 10 percent by volume, should be at least about an inch in maximum dimension. The thickness of the flakes depends to some extent on the material used. More flexible materials such as polyethylene, vinyl polymers, rubber, and the like can be as much as 0.01 inch (10 mils) or even more. The less flexible materials such as cellulose acetate, on the other hand, should be from about 0.5 to about 3 or 4 mils. Many other flexible materials, such as polyethylene terephthalate, cellulose nitrate photographic film, and the like will occur to those skilled in the art. Another necessary property of the flakes is that they be of water-resistant material. That is, they should not lose more than about 50 percent of their strength when soaked in water for a period of about 24 hours. Paper, for example, while being a flexible sheet material, is too water-sensitive without a waterproof coating for use as the flake material. Preferably, substantially water-insensitive synthetic polymers, such as polyethylene, should be used. By the term "flexible" we mean a material which can be folded and creased along a line back and forth at least about 20 times without breaking. Mica flakes, for example, break after from 1 to about 5 folds. Cellulose acetate photographic film about six mils thick breaks after being folded and creased about 25 or 30 times and is thus near the limit of flexibility which should be used. Polyethylene film about two mils thick, on the other hand, can be folded and creased more than a hundred times and still not break. The regenerated cellulose sheet is also very flexible according to this test. The highly flexible substantially water-insensitive materials such as polyethylene and lacquered regenerated cellulose are preferred.

Both Fibers 1 and 2 were mixtures of different size fibers varying from about ¾-inch long down to less than ⅛ inch. Both were rather small in diameter, averaging on the order of about 0.005 inch. There is no reason why larger fibers up to as large as about 0.1 inch in diameter cannot be used as long as they remain sufficiently flexible to pass through openings such as bit ports in the mud system and conform to the irregular surfaces of gravel beds and the like. Conformance to the ⅝-inch marbles is a measure of this property. Some fibers ferment or weaken upon exposure to water. Most of these are satisfactory for a few days, however, so that they can be used where short-term seals are satisfactory. The fibers should be water-resistant in the sense that they do not lose more than about half their strength in 24 hours when soaked in water. The substantially water-insensitive fibers, such as wool, polyamide polymers and the like are preferred.

The hard, strong rigid particles are preferably ground nutshells because of their strength, low water sensitivity and low cost. Other hard, strong, rigid materials, such as other ground hard portions of plant seeds, can also be used. Hard and strong thermoset resins or even high-melting thermoplastic resins may also be used. Ground battery cases can be used for example. In general, the materials which can be used are those described as satisfactory in U.S. Patents 2,943,679 and 2,943,680. The particle size, shape and particle-size distribution described in these patents, however, do not need to be observed in the three-way mix. The flakes and fibers perform many of the functions of the smaller granular particles. As shown in Test 24, the flatter non-granular strong flakes were satisfactory in the presence of the flexible flakes and fibers. The granules are preferred, however, since they provide greater strength. Test 25 shows that if a high concentration of granules is used, the size of the particles should not exceed those passing about a number 10 sieve, as used in Test 9. Test 21, however, shows that a lower concentration of larger granules can be tolerated. Preferably, the granules should pass a number 10 sieve and should certainly pass a number 4 sieve. In order to provide good strength, at least about 25 percent by volume of the granules should be retained on a number 16 sieve. Preferably at least about ⅓ of the particles should be retained. As in the case of the flakes and fibers, the strong particles must be water-resistant and preferably should be susbtantially water-insensitive materials such as walnut shells.

The nature of the three components of the additive is important. The nature of the flakes has been shown to be critical. Another critical factor is the ratio of the flakes, fibers and granules. Tests 9, and 16 to 19 in the table show the importance of the ratio of flakes to fibers. These tests demonstrate that while a partial seal can be obtained on the marbles with as much as three times as much fibers as flakes, at least as much flakes as fibers should be used if a complete seal is desired. Test 7 shows a partial seal can be formed with no fibers if the ratio of flakes to granules is kept high. Test 5, however, shows that no seal forms in the absence of fibers if the amount of granules is as great as the amount of flakes. For this reason, the ratio of flakes to fibers should not exceed about 3/1 and preferably should be between about 2/1 and 1/1.

The series of tests from 26 to 28, taken with Test 9 shows the effects of granules concentration. It will be obvious that no seal forms when the amount of granules is as great as the sum of flakes and fibers, and only a partial seal forms when the amount of granules is about ⅔ the sum of flakes and fibers. When the amount of granules, flakes and fibers are equal, Test 9 shows a complete seal forms. Test 28 shows that when the amount of granules is only about ¼, the sum of flakes and fibers, very good results are obtained in both the slot and marbles tests. Test 4 shows that some granules, for example about ⅒ the sum of flakes and fibers, are necessary if good results in the slot test are to be obtained. Since the differential pressure between the well and formation may sometimes exceed the 100 pounds per square inch used in the tests, and since the strong granules give strength to the seal, the amount of granules should preferably be at least about ⅓ the sum of flakes and granules.

If the pressure differential is known to greatly exceed 100 pounds per square inch, and if the loss is known to be to a fracture, crevice, or the like, then it is advisable to change the content of granules in the carrying liquid. This can be simply accomplished by introducing additional granular particles into the slurry containing the three-way mix. The amount of added ground nutshells or other granules may be as great as the sum of the amounts of flakes, fibers and granules in the mix. The added granules should, in general, fall within the limits specified in U.S. Patent 2,943,680 Scott. As noted in the Scott patent, ground nutshells, when used alone, are effective in sealing fractures and crevices at high pressure differentials across the seal. The three-component mix with ground nutshells added is even more effective than the nutshells alone, particularly at low concentrations. It should be noted that the high concentration of ground nutshells decreases the ability to seal unconsolidated gravel and the like. In the appropriate case, however, the three-component mix with up to an equal amount of added granular material can be very advantageously used. It is possible to premix the additional granules with the three-component mix before adding to the liquid. It is generally more convenient, however, to handle the three-component mix and the additional granular material separately and mix them separately into the carrying liquid.

Most of the tests have been made with single types of flakes, fibers and granules to aid in determining what will work and what will not. It will be apparent, as shown in Test 21 for example, that mixtures of different types of flakes, fibers or granules can also be used as long as all fall within the limits set forth above. The flakes may be laminates.

In the table, all concentration values are in pounds per barrel. The barrel intended in this case, as well as elsewhere herein, is the one used in the oil fields containing 42 U.S. gallons. Ratios of ingredients should be in terms of volumes rather than weights. Flake 1, Fiber 1, and walnut sheels all have approximately the same density, ranging from about 1.35 for the walnut shells to a little over 1.5 for the fibers. Therefore, the ratios by weight are substantially the same as ratios by volume. If an ingredient of widely different density is used, its density should be taken into consideration in determining the amount to be used so the ratios by volume will remain within the required limits. Some natural materials, such as cane fibers, cotton seed hulls and the like contain pulp or other material which is neither flakes, fibers nor granules. Such materials are usually inert and can be disregarded, except that they must be taken into consideration in determining the amount to use of the ingredient containing the inert material. In this connection, when the term "consisting essentially of" is used herein, it will be understood that it is intended to include not only the materials named, but those such as pulp or thickeners such as clay or soaps for the carrying liquid such as water or oil, which do not substantially adversely affect the properties of the composition. The carrying liquid for the mix usually is water, oil or an emulsion of the two. The liquid or emulsion may be thickened. Preferably it is an aqueous clay slurry.

Usable concentration ranges of the combination of flexible flakes, fibers and granules run from about 15 pounds per barrel as shown in Test 29 of the table to about 50 or 60 pounds per barrel. Test 29 in the table shows that 15 pounds per barrel concentration is about as low as should be used since only a partial seal was formed over the marbles. Test 30 shows that 45 pounds per barrel gives good results. All the compositions in the table were checked in a carrying fluid prepared by mixing 7 percent sodium bentonite into fresh water, and then adding a little more water to adjust the Fann apparent viscosity to 25 centipoises. This thickened fluid was useful for supporting low concentrations such as that used in Test 29, but for the higher concentrations such as that used in Test 30, a somewhat lower carrying liquid viscosity is advisable in the field to avoid a final viscosity which is too high. A concentration as high as about 60 pounds per barrel can be used in most cases and a concentration in the range of 30 to 60 pounds per barrel is preferred. Actually, the upper limit of concentration is the maximum which will permit pumping the liquid suspension to the zone in the well to which drilling fluid is being lost.

An example of use of our invention is as follows: A well is drilling at about 8,000 feet when the mud pit level begins to drop, indicating loss of circulation. It is not known whether the loss is to fractures, crevices or gravel beds. About 50 barrels of the drilling fluid is placed in a tank or pit and about 2500 pounds of the mix shown in Test 9 of the table is mixed into the drilling fluid. This batch or "pill" is pumped down the drill pipe through the bit to the bottom of the well. It is followed by ordinary drilling fluid to fill the drill pipe and displace the lost circulation agent out of the pipe and into the well. Circulation is then stopped and the lost circulation composition is permitted to stand in contact with the formation for about an hour. Circulation is then very slowly commenced. The circulation rate is gradually increased until it is again at the desired level without further loss of drilling fluid to the drilled formations.

Examples are presented above by way of illustration. It will be understood that we do not wish to be limited to these examples but only by the following claims.

We claim:

1. A composition useful for introducing into a well in a carrying liquid for stopping loss of drilling fluids to drilled formations, said composition consisting essentially of water-resistant flexible flakes at least about 10 percent by volume of which have at least one dimension of at least about 1 inch, water-resistant fibers sufficiently flexible to pass through mud pumps and bit ports and conform to marbles about 5/8 inch in diameter, said fibers being mixtures of various length fibers varying from about 3/4-inch long to less than 1/8-inch long, the volume of fibers being from about 1/3 to about 3 times the volume of flexible flakes, and water-resistant strong rigid particles selected from the group consisting of flakes and granules which will pass a number 4 U.S. Standard sieve and at least about 25 percent by volume of which will be retained on a number 16 sieve, the volume of strong particles being between about 1/10 and about 2/3 times the sum of volumes of flexible flakes and fibers.

2. A composition useful for introducing into a well in a carrying liquid for stopping loss of drilling fluids to drilled formations, said composition consisting essentially of substantially water-insensitive flexible flakes at least about 50 percent by volume of which have at least one dimension of at least about one inch, substantially water-insensitive fibers sufficiently flexible to pass through mud pumps and bit ports and conform to marbles about 5/8 inch in diameter, said fibers being mixtures of various length fibers varying from about 3/4-inch long to less than 1/8-inch long, the volume of fibers being from about 1/3 to about 1 times the volume of flexible flakes, and substantially water-insensitive strong, rigid granular particles which will pass a number 10 U.S. Standard sieve and at least about 1/3 by volume of which will be retained on a number 16 sieve, the volume of granular particles being between about 1/3 and about one times the sum of volumes of flexible flakes and fibers.

3. The composition of claim 2 in which said flexible flakes are selected from the group consisting of polyethylene and lacquered regenerated cellulose, said fibers are shredded carpets, and said granular particles are nutshells.

4. A composition for stopping loss of drilling fluids from a well to drilled formations consisting essentially of a carrying liquid containing water-resistant flexible flakes at least about 10 percent by volume of which have at least one dimension of at least about one inch, water-resistant fibers sufficiently flexible to pass through mud pumps and bits ports and conform to marbles about 5/8 inch in diameter, said fibers being mixtures of various length fibers varying from about 3/4-inch long to less than 1/8-inch long, the volume of fibers being from about 1/3 to about 3 times the volume of flexible flakes, and water-resistant strong, rigid particles selected from the group consisting of flakes and granules which will pass a number 4 U.S. Standard sieve and at least about 25 percent by volume of which will be retained on a number 16 sieve, the volume of strong particles being between about 1/10 and about 2/3 times the sum of volumes of flexible flakes and fibers, the total amount of flexible flakes, fibers and strong particles being between a minimum of about 15 pounds per barrel of carrying liquid and a maximum which permtis pumping the composition to the zone in the well to which drilling fluid is being lost.

5. The composition of claim 4 in which said composition also contains additional granular particles up to an amount equal to the sum of the amounts of flakes, fibers and granules specified in said claim 4, to make the composition more effective for sealing fractures and crevices subjected to high differential pressure.

6. A composition for stopping loss of drilling fluids from a well to drilled formations consisting essentially of an aqueous clay slurry containing substantially water-insensitive flexible flakes at least about 50 percent by volume of which have at least one dimension of at least about one inch, substantially water-insensitive fibers sufficiently flexible to pass through mud pumps and bit ports and conform to marbles about 5/8 inch in diameter, said fibers being mixtures of various length fibers varying from about 3/4-inch long to less than 1/8-inch long, the volume of fibers being from about ⅓ to about 1 times the volume of flexible flakes, and substantially water-insensitive strong, rigid granular particles which will pass a number 10 U.S. Standard sieve and at least about ⅓ by volume of which will be retained on a number 16 sieve, the volume of granular particles being between about ⅕ and about one times the sum of volumes of flexible flakes and fibers, the total amount of flexible flakes, fibers and strong particles being between about 30 and about 60 pounds per barrel of slurry.

7. The composition of claim 6 in which said flexible flakes are selected from the group consisting of polyethylene and lacquered regenerated cellulose, said fibers are shredded carpets, and said granular particles are nutshells.

8. A method for stopping loss of drilling fluid to formations penetrated by a well comprising mixing into a carrying liquid water-resistant flexible flakes at least about 10 percent by volume of which have at least one dimension of at least about one inch, water-resistant fibers sufficiently flexible to pass through mud pumps and bit ports and conform to marbles about ⅝ inch in diameter, said fibers being mixtures of various length fibers varying from about ¾-inch long to less than ⅛-inch long, the volume of fibers being from about ⅓ to about 3 times the volume of flexible flakes, and water-resistant strong particles selected from the group consisting of flakes and granules which will pass a number 4 U.S. Standard sieve and at least about 25 percent by volume of which will be retained on a number 16 sieve, the volume of strong particles being between about ⅒ and about ⅔ times the sum of volumes of flexible flakes and fibers, and displacing the resulting preparation down the well to the zone to which drilling fluid is being lost.

9. A method for stopping loss of drilling fluid to formations penetrated by a well comprising mixing into an aqueous clay slurry substantially water-insensitive flexible flakes at least about 50 percent by volume of which have at least one dimension of at least about one inch, substantially water-insensitive fibers sufficiently flexible to pass through mud pumps and bit ports and conform to marbles about ⅝ inch in diameter, said fibers being mixtures of various length fibers varying from about ¾-inch long to less than ⅛-inch long, the volume of fibers being from about ⅓ to about 1 times the volume of flexible flakes, and substantially water-insensitive strong, rigid granular particles which will pass a number 10 U.S. Standard sieve and at least about ⅓ by volume of which will be retained on a number 16 sieve, the volume of granular particles being between about ⅕ and about one times the sum of volumes of flexible flakes and fibers, the total amount of flexible flakes, fibers and strong particles being between about 30 and about 60 pounds per barrel of slurry, and displacing the resulting preparation down the well to the zone to which drilling fluid is being lost.

10. The method of claim 9 in which said flexible flakes are selected from the group consisting of polyethylene and lacquered regenerated cellulose, said fibers are shredded carpets, and said granular particles are nutshells.

References Cited
UNITED STATES PATENTS

| | | | |
|---|---|---|---|
| 2,119,829 | 6/1938 | Parsons | 255—1 |
| 2,353,372 | 7/1944 | Stone | 252—8.5 |
| 2,599,745 | 6/1952 | Campbell et al. | 252—8.5 |
| 2,799,647 | 7/1957 | Borcherdt | 252—8.5 |
| 2,815,079 | 12/1957 | Goins | 166—29 |
| 2,943,679 | 7/1960 | Scott | 166—21 |
| 2,943,680 | 7/1960 | Scott | 166—21 |

OTHER REFERENCES

Composition and Properties of Oil Well Drilling Fluids, copyright 1948, Gulf Publishing Co., pp. 449–451, copy in 354.

Petroleum Engineering, copyright 1960; Prentice-Hall Inc., pp. 85–87, copy in 354.

CHARLES E. O'CONNELL, *Primary Examiner.*

NILE C. BYERS, *Examiner.*